July 28, 1931.  W. C. MASON  1,816,783
VISOR
Filed Nov. 1, 1926    2 Sheets-Sheet 1
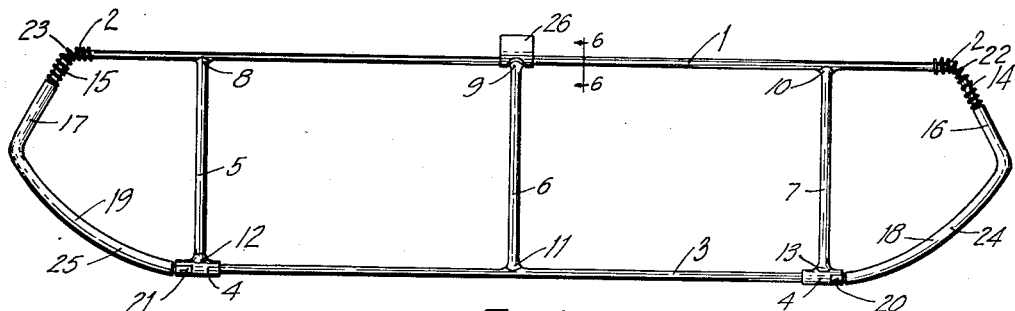
FIG.1
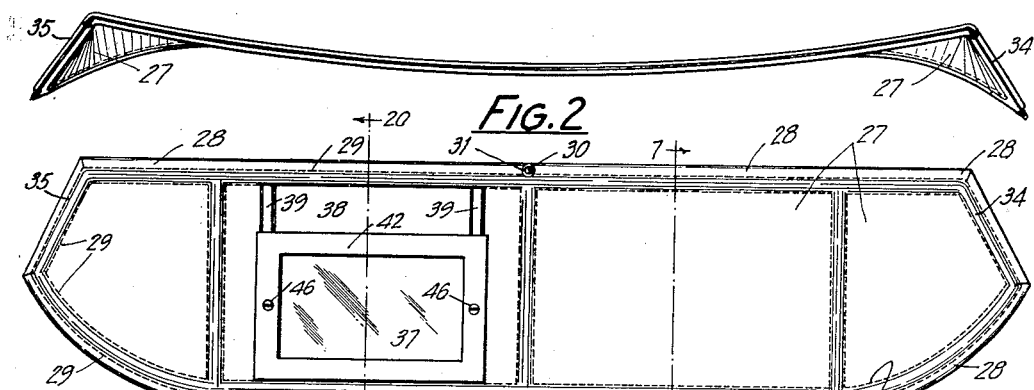
FIG.2
FIG.3
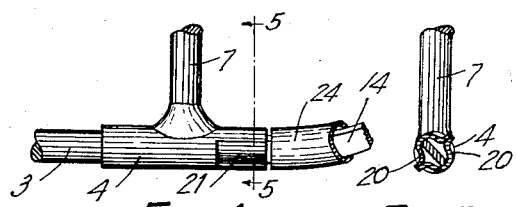
FIG.4    FIG.5    FIG.6
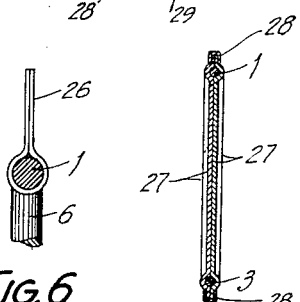
FIG.7
FIG.9    FIG.11
FIG.12
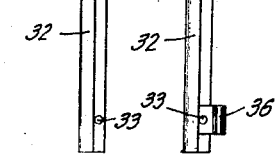
FIG.8    FIG.10
INVENTOR
William C. Mason
By
ATTORNEY July 28, 1931. W. C. MASON 1,816,783
VISOR
Filed Nov. 1, 1926 2 Sheets-Sheet 2
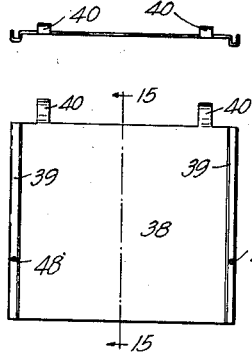
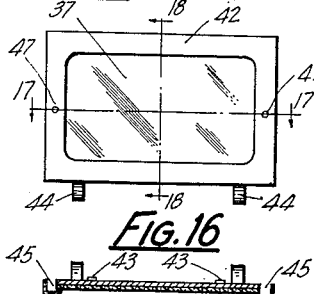
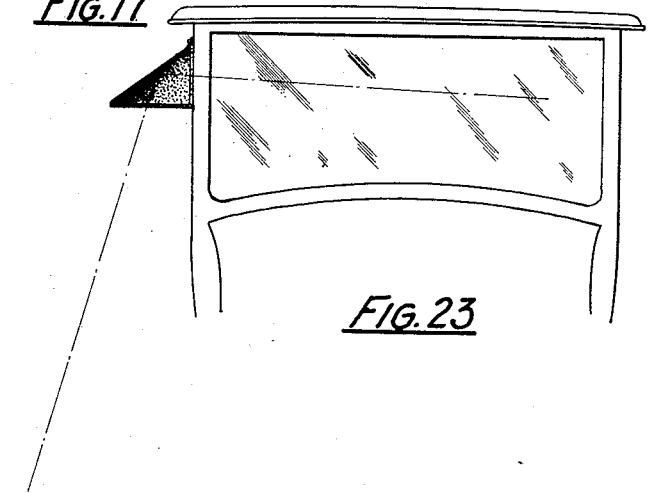
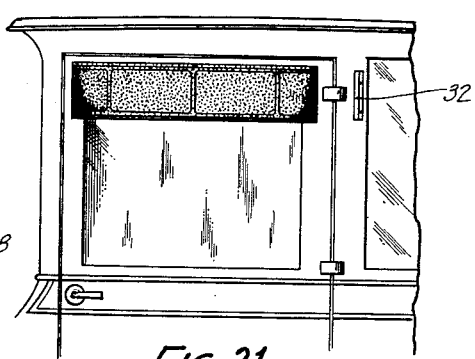
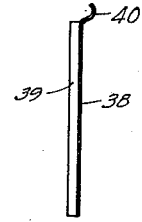
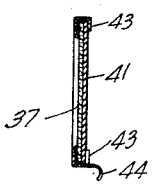
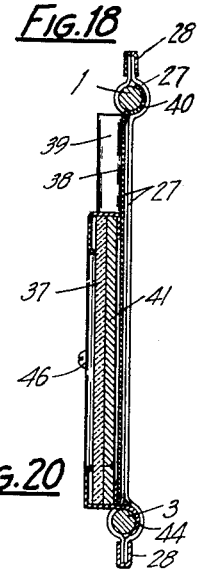
INVENTOR
William C. Mason
BY
ATTORNEY Patented July 28, 1931

1,816,783

UNITED STATES PATENT OFFICE

WILLIAM C. MASON, OF ALBANY, NEW YORK

VISOR

Application filed November 1, 1926. Serial No. 145,540.

REISSUED

My invention relates to visors and particularly to a visor adapted to be attached to the door of a vehicle having an enclosed body.

The doors of all automobiles having bodies of the sedan or similar type are provided with windows which are vertically slidable in the frame of the door. Enclosed bodies of this type are substantially air and water tight when the windows are closed, and because of the heat developed by the motor, become extremely uncomfortable to the passengers in warm weather when it is necessary to close the windows tightly to keep out rain. In cold weather too, it is practically impossible to drive with the windows tightly closed because the moisture which condenses on the inside of the windshield and windows impairs or entirely obstructs the vision of the operator. For these reasons, it is almost necessary to have one or more of the windows open to some extent at all times. Where the windows are open sufficiently to provide adequate ventilation during rainy weather, water, either dropping from the roof or different parts of the body, or descending as rain, is driven through the open windows into the interior of the car. In cold weather when it is necessary to provide a circulation of air within the body to prevent condensation of moisture on the windows, one or more of the windows must be open to some extent and this, it is well known, invariably produces annoying drafts of air upon some of the passengers occupying the vehicle.

To obviate these difficulties, my invention contemplates a vehicle door having a visor-like projection extending from the upper part thereof and adapted to swing with the door; or the application to the side door of a vehicle body, of an inclined visor fitted tightly against the side of the body extending downwardly and outwardly from the top of the door or window a sufficient distance to prevent the entrance of rain and the creation of a direct draft when the glass in the door or window is somewhat lowered. My invention also contemplates a visor having a mirror or other reflector associated with the inner surface thereof and which may be applied to the forward door on that side of the vehicle drawn up to the curb, and which will be inclined at such an angle to the line of sight of the operator as to indicate to him the position of his vehicle relative to the curb.

The objects of my invention, therefore, are to provide a vehicle door having a visor of this general character, or to provide a visor which may be attached to the present type of side door of an automobile body. Another object of my invention is to provide a device of this character which may be readily adjusted to conform to the various shapes of doors to which it is desired to attach it. Another object of my invention is to provide a device of this character which may, if desired, be readily detached from the vehicle door, and which will be of such character and shape that it may be stored under a seat of the vehicle or shipped in a substantially flat position. Another object of my invention is to provide a visor of this type having a mirror or other reflector attached thereto, and which, although flexible and resilient, to make it conformable to various body shapes, will be substantially rigid when affixed to the car. And still another object of my invention is to provide a visor of such shape that water impinging on the forward part thereof will not drop from that part, but will be carried to and drop from the rear end of the visor where it cannot be driven through the open window.

With these objects in view my invention includes the novel elements and combinations and arrangements of elements described below and illustrated in the accompanying drawings in which—

Fig. 1 is a view of the frame of my visor;

Fig. 2 is a top view of the visor without the mirror;

Fig. 3 is a front view of Fig. 2, and is a view of the inside face of the visor;

Fig. 4 is an enlarged view of a portion of the frame;

Fig. 5 is a section of Fig. 4 in the plane 5—5;

Fig. 6 is an enlarged section in the plane 6—6 of Fig. 1;

Fig. 7 is a section of Fig. 3 in the plane 7—7;

Fig. 8 is an enlarged view of a clip by means of which my visor is attached to the body of the car;

Fig. 9 is a top view of the clip shown in Fig. 8;

Figs. 10 and 11 are similar to Figs. 8 and 9 except that they show an additional detail of the connecting means;

Fig. 12 is a top view of the attaching means illustrating how the visor may be permanently affixed to the body of the car;

Fig. 13 is an elevation view of a plate forming part of the mirror attaching means;

Fig. 14 is a top view of the plate shown in Fig. 13;

Fig. 15 is a section of Fig. 13 in the plane 15—15;

Fig. 16 is a front elevation view of the mirror and its frame;

Fig. 17 is a section of Fig. 16 in the plane 17—17;

Fig. 18 is a section of Fig. 16 in the plane 18—18;

Fig. 19 is a top view of the mirror and frame;

Fig. 20 is an enlarged section through the visor and mirror showing how they are secured together;

Fig. 21 is a fragmentary side elevation of the door of an automobile showing the attachment of my visor;

Fig. 22 is a fragmentary elevation of the door of a slightly different type of body illustrating how my visor may be made to conform to the shape thereof; and Fig. 23 is a fragmentary front view of a vehicle body illustrating the slope of the visor and the line of vision of the operator reflected from the mirror on the interior of the visor to the curb.

Referring to the drawings, the frame of my visor is preferably of comparatively heavy steel wire comprising the upper longitudinal member, 1, which terminates at the points, 2; the lower longitudinal member, 3, which terminates and is preferably welded within the sleeves, 4; and the transverse connecting members, 5, 6 and 7, which are preferably welded to the longitudinal members as shown at 8, 9, 10 and 11, and to the sleeves, 4, as shown at 12 and 13.

The ends of the frame are formed of the bent members, 14 and 15, which are preferably of highly resilient material, such as spring steel, and preferably rectangular in cross-section, as best shown in Figs. 4 and 5. The members, 14 and 15, include straight portions, 16 and 17, which are substantially normal to the curvilinear portions, 18 and 19.

Referring to Fig. 22 it will be observed that the angle included between the plane of the visor and the plane of the door is slightly greater than 45 degrees. For this reason, when the resilient members, 14 and 15, are rectangular in cross-section the members are secured within the sleeves, 4, so that, the planes of the larger faces of the rectangle lie at an angle of about 45 degrees to the plane of the frame or visor as shown in Fig. 5. When the visor is attached to the vehicle, as shown in Figs. 21 and 23, the larger faces of the rectangular, resilient members, 14 and 15, are substantially vertical, so that while the corners of the visor are easily flexed in a horizontal plane they are rigid and inflexible vertically. The extremities of the curvilinear portions are secured within the sleeves, 4, by compressing a portion of the sleeves inwardly as shown at, 20 and 21, to distort them as shown in Fig. 5. The extremities of the straight portions of the resilient members are connected to the extremities of the member, 1, by means which will form a flexible connection having a universal movement. I find that small helical springs, 22 and 23, simply forced over the ends of the member, 1, and the ends of the members, 14 and 15, respectively, serve the purpose very well. Before these springs are attached, short lengths of rubber tubing, 24 and 25, are slipped over members, 14 and 15, respectively, so that when the covering is applied to the frame the bead about the edges thereof appears uniform in size. This tubing also serves to protect the covering fabric from being worn by the rather sharp edges of the members, 14 and 15.

Before the member, 6, is welded to member, 1, a small thin piece of brass or other metal, 26, having an opening therein, is slipped over member, 6, and after the joint has been welded, this is brought up and pressed about member, 1, as shown in Figs. 1 and 6. The entire frame is then covered with a waterproof fabric, 27, which is bound at the edges by suitable material, 28, and stitched on each side of each frame member, as shown at 29. The covering material and the binding are flexible, and at the top of the visor form a tight seal between the visor and the door. In order to hold the center of the visor securely against the door, a hole, 30, adapted to receive a screw, is punched in the top center as shown in Fig. 3. This hole passes through the binding, the covering material and the plate, 26, and a metal grommet, 31, is secured in the hole, thus eliminating all strain on the fabric due to the connecting screw.

To attach the visor to the door, two channel-clips, 32, such as illustrated in Figs. 8 and 9, are secured to the outside of the door by means of screws passing through the holes, 33. One of these clips, attached to the rear door, is shown in Fig. 21. The visor is then sprung into the proper shape and the portions, 34 and 35, are inserted within the channel-clips, 32, where they are securely held by the outward action of the resilient members, 14 and 15, respectively; and a screw is inserted through the grommet, 31, into the door. This screw holds the top of the visor securely against the door and also prevents it from sliding vertically in the channels.

When it is desired to affix the visor permanently to the side of the door small, widely-opened, V clips, 36, are provided which may be pressed down into the position shown at 36' in Fig. 12, to prevent the members, 34 and 35, from being withdrawn from the clips.

The visor on the right hand front door may, if desired, be provided, upon its inside surface with a mirror, 37, which will be found of great convenience to the driver in approaching the curb. In order that this mirror may be readily attached to the completed visor without any unsightly projections from the exterior, I provide the following described means. A comparatively thin plate, 38, having a vertical depth slightly less than the distance between the members, 1 and 3, and provided at its lateral edges with the stiffening ribs, 39 and on its top edge with the curved projections, 40, is first secured to the visor as follows: Small slits about equal in width to the projections, 40, and spaced to receive these projections, are made through the inside covering of the visor just below the member, 1. The ends of the projections, 40, are inserted through these slits and the plate, 38, is then swung downwardly into the position shown in Fig. 20 so that the clips, 40, are forced upwardly behind the member, 1, and between that member and the outside covering, 27. The mirror, 37, with a suitable backing, 41, of cardboard or the like, is secured in a frame, 42, by the bent over portions of the frame, 43, at the top and bottom thereof. The bottom of the frame is also provided with the curved projecting portions, 44, somewhat similar to the curved projections, 40, of the plate, 38. Two slits are made in the inner covering just above the member, 3, and the ends of the portions, 44, of the mirror frame are inserted therein. The frame is then swung upwardly so that the portions, 44, engage the back of the member, 3, and pass between that member and the outer covering as shown in Fig. 20. The back lateral edges of the frame are provided with the channels, 45, adapted to receive the ribs, 39, on the plate, 38, and the mirror frame and the plate are then secured together by screws, 46, passing through the holes, 47, in the frame and engaging the ribs, 39, at 48, as shown in Fig. 14.

My visor, before attaching to the car, may be substantially planiform, but I find that where it is plane, the upper edge thereof tends to bulge away from the door when the visor is sprung between the clips, 32. To obviate this, the visor is sprung or permanently deformed to about the shape shown in Fig. 2. When thus deformed, it will be found that as it is grasped at the ends and pressed against the door, the center thereof will touch first, and as the ends are sprung inwardly to engage the clips the entire top edge will be brought to lie closely against the plane or convex front surface of the door and will not bulge when pressed into the proper position. On account of the resiliency of the frame, this slight deformation or warping does not prevent its being pressed flat for storing or shipping.

It is well known that all cars do not have the tops of the doors substantially horizontal, as shown in Fig. 21, yet the sides of the window are invariably vertical. A rigid, preformed visor adapted to fit a door such as shown in Fig. 21 cannot be æsthetically associated with a door having a sloping top as shown in Fig. 22. Because of the flexibility of my visor, it may be attached to the door so that the top thereof slopes to conform with the top slope of the door and the sides thereof are vertical to conform to the edges of the casing, thus producing a combination not disturbing to the æsthetic eye.

When a car is equipped with visors of this character the windows thereof may be lowered a considerable distance to admit fresh air without permitting water to be driven in, or without causing any unpleasant drafts. In preventing the entrance of water, the shape of the ends of my visor is quite important. Where the front end or transverse portion of the visor does not merge gradually and smoothly into the longitudinal portion, rain striking against the forward end will flow down to and drop from the front edge and be driven through the open window. In my visor the ends are conical in shape and merge smoothly into the longitudinal plane portion so that rain water impinging upon the visor is carried to the rear by the action of the wind and does not drop from the front part when the vehicle is in motion.

While I have described my visor in its preferred form, it is to be understood that I do not wish to limit myself in any way to a visor of the flexible character described, nor to a visor of any particular material or construction. While I prefer a visor which is opaque and which will serve not only as a means for preventing the entrance of rain but also as a sun shade, a visor of glass or celluloid will serve equally well to prevent the entrance of rain. I therefore wish it clearly understood that my invention, in its broad aspects, includes the combination with a door of a visor performing the functions which I have described, and that my invention is not limited to the particular type illustrated. Furthermore, it is obvious that if desired a door having a visor as an integral part thereof may be easily constructed.

It is therefore to be understood that the words which I have used in describing my invention are words of description rather than words of limitation and that changes within the purview of the appended claims may be made without departing from the true scope and spirit of my invention in its broadest aspects.

What I claim is—

1. A visor of the character described, having a comparatively rigid central portion adapted to extend substantially across the side window of an automobile, and comparatively resilient end portions adapted to be easily flexed to extend between the body of said automobile and said first mentioned portion.

2. A visor of the character described comprising a frame and a covering tautly stretched thereover; said frame being substantially rigid throughout in the direction in which it is stressed by the covering but having end portions which may be flexed to a substantial degree.

3. A visor of the character described comprising a frame and a covering therefor normally forming a substantially plane-like structure, the central and major portion of said frame being substantially rigid, but the end portions being resilient and easily flexed within their elastic limit to form curved surfaces merging smoothly into the central portion.

4. In a visor of the character described, a frame comprising spaced parallel members; one of said members being somewhat longer than the other and flexibly connected at its ends to resilient elements rigidly associated with the shorter member.

5. In a visor of the character described, a frame comprising spaced, comparatively rigid members of slightly different length in symmetrically disposed relation, and connected at their extremities by resilient, comparatively flexible members normally lying substantially in the plane of said first mentioned members but adapted to be sprung to form end portions for said visor angularly disposed to the central portion.

6. In a visor comprising a frame and a covering therefor, a frame member forming the lower edge of said visor having resilient end portions of comparatively great rigidity in a vertical plane when said visor is in position for attachment, but easily flexible in a horizontal plane.

7. The combination with a vehicle door having a window therein opening from the top, of a visor sloping donwardly from the upper portion of said door and extending entirely around the upper portion of the window but providing direct, unobstructed, downward view therethrough; whereby air and rain will not be driven into said vehicle when the window is slightly lowered for ventilation.

8. The combination with a vehicle door having a window therein opening from the top downwardly, of a detachable visor sloping downwardly from the upper portion of said door and about and adjacent the upper portion of said window, said visor comprising a frame having a comparatively rigid intermediate portion, and flexible end portions lying in a substantially common plane before attachment to the car, and means mounted on said door to which the end portions may be attached when in flexed condition.

9. The combination with a vehicle having a side door with a window therein opening from the top downwardly, of a visor extending outwardly from said door and curving smoothly about the upper corner of said window nearest the front of the vehicle; whereby rain striking against said visor will not drip from the front end and be driven through said window when slightly lowered.

10. The combination with a vehicle body having a side window therein, of a visor sloping downwardly from its junction with the side of said body over the upper portion of the window but providing direct, unobstructed downward view therethrough, and a mirror secured to the inner side of said visor adapted to reflect the road surface at the side of the vehicle to the eye of the driver; whereby the driver may judge the distance of the vehicle from the curb.

11. In a visor having a portion adapted to be attached to the side of a vehicle body to form a substantially plane like structure with one edge in contact with said body and sloping downwardly and outwardly therefrom, a mirror secured to said visor on the side which will be underneath when attached to said body, and adapted to reflect to the eye of the operator the clearance space between said vehicle and a curb.

12. In a visor, the combination with a plane portion adapted to extend substantially across the side window of a vehicle body, of a mirror rigidly secured adjacent said plane portion, and end portions offset from the plane portion adapted to rest against the side of said body to support said mirror and plane portion at the proper angle to reflect to the eye of the operator the clearance space between the side of the vehicle and a curb.

WILLIAM C. MASON.